United States Patent
Fu et al.

(10) Patent No.: US 9,586,193 B2
(45) Date of Patent: Mar. 7, 2017

(54) MATERIAL AND EXHAUST GAS SYSTEM AND METHOD FOR USING THE SAME

(71) Applicant: GENERAL ELECTRIC COMPANY, Schenectady, NY (US)

(72) Inventors: Qijia Fu, Shanghai (CN); Xiao Zhang, Shanghai (CN); Chuan Lin, Shanghai (CN); Youhao Yang, Shanghai (CN); Daniel Norton, Niskayuna, NY (US); Larry Neil Lewis, Scotia, NY (US); Xiaoying Bao, Schenectady, NY (US); Susan Elizabeth Corah, Glenville, NY (US); Yu Dong, Shanghai (CN); Dejia Wang, ShangHai (CN); Shizhong Wang, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 423 days.

(21) Appl. No.: 13/945,951

(22) Filed: Jul. 19, 2013

(65) Prior Publication Data
US 2015/0023863 A1 Jan. 22, 2015

(30) Foreign Application Priority Data
Aug. 1, 2012 (CN) .......................... 2012 1 0272152

(51) Int. Cl.
| | | |
|---|---|---|
| B01J 23/00 | (2006.01) | |
| B01D 53/94 | (2006.01) | |
| B01J 23/75 | (2006.01) | |
| B01J 23/83 | (2006.01) | |
| B01J 23/04 | (2006.01) | |
| B01J 23/10 | (2006.01) | |
| B01J 23/78 | (2006.01) | |

(52) U.S. Cl.
CPC .......... *B01J 23/005* (2013.01); *B01D 53/944* (2013.01); *B01J 23/75* (2013.01); *B01J 23/83* (2013.01); *B01D 2255/2022* (2013.01); *B01D 2255/2025* (2013.01); *B01D 2255/2065* (2013.01); *B01D 2255/2092* (2013.01); *B01D 2255/20746* (2013.01); *B01D 2255/30* (2013.01); *B01D 2255/40* (2013.01); *B01D 2258/012* (2013.01); *B01J 23/04* (2013.01); *B01J 23/10* (2013.01); *B01J 23/78* (2013.01)

(58) Field of Classification Search
CPC ... B01J 23/78; B01J 23/04; B01J 53/94; B01J 23/10
USPC ................. 423/415.1, 243; 422/180
See application file for complete search history.

(56) References Cited

U.S. PATENT DOCUMENTS

| | | |
|---|---|---|
| 6,843,054 B2 | 1/2005 | Taylor et al. |
| 7,179,430 B1 | 2/2007 | Stobbe et al. |
| 7,431,749 B2 | 10/2008 | Kim et al. |
| 7,506,504 B2 | 3/2009 | Kumar |
| 7,569,197 B2 | 8/2009 | Johansen |
| 7,679,806 B2 | 3/2010 | Wehrhan et al. |
| 7,745,363 B2 | 6/2010 | Beall et al. |
| 7,797,931 B2 | 9/2010 | Dubkov et al. |
| 2007/0193254 A1* | 8/2007 | Johannes .............. F01N 3/0871 60/286 |
| 2008/0102002 A1 | 5/2008 | Chung et al. |
| 2009/0203517 A1 | 8/2009 | Mizutani et al. |
| 2010/0093529 A1 | 4/2010 | Hayashi |
| 2011/0319690 A1 | 12/2011 | Deng et al. |

FOREIGN PATENT DOCUMENTS

| | | | |
|---|---|---|---|
| CN | 1812945 A | 8/2006 | |
| CN | 101370748 A | 2/2009 | |
| EP | 470197 B1 | 8/1993 | |
| EP | 1701179 A1 | 9/2006 | |
| GB | 2316069 A * | 2/1998 | ............ C01B 39/46 |
| JP | 2112609 A | 4/1990 | |

OTHER PUBLICATIONS

Matsui, Tomoaki, et al., "Crystal Chemistry of Synthetic Mn-bearing Anorthite: Incorporation of MnAl2Si2O8 End-Member into Feldspar", European Journal of Mineralogy, Germany, vol. 9, Issue No. 2, pp. 333-344, Jan. 1997 (Jan. 1, 1997).
EP Search Report and Written Opinion dated Nov. 22, 2013 from corresponding Application No. 13178575.0.
Unofficial English Translation of Chinese Office Action issued in connection with corresponding CN Application No. 201210272152.8 on Jan. 30, 2015.
Volkan., "Diesel Soot Oxidation Catalyst Filter System Design", pp. 1-93, Jun. 2005.
Klingenberg et al., "Interstitial cristobalite-type compounds (Na2O)=<0.33Na[AlSiO4]", Journal of Solid State Chemistry, vol. 61, Issue No. 01, pp. 40-46, Jan. 1, 1986, Orlandom, FL, US.

* cited by examiner

*Primary Examiner* — Matthew E Hoban
*Assistant Examiner* — James Fiorito
(74) *Attorney, Agent, or Firm* — GE Global Patent Operation; Peter T. DiMauro (57) ABSTRACT

A material is described of formula $Na_xM_yAl_zSi_bO_\delta$ with Face Centered Cubic (fcc) lattices forming F-4 3 m cubic structure, wherein M is at least one of lithium, potassium, rubidium, caesium, vanadium, chromium, iron, cobalt, nickel, ruthenium, rhodium, palladium, silver, osmium, iridium, platinum, gold, and cerium; $0<x+y\leq22/3$; wherein when y=0, $4<x\leq/3$, when $0<y\leq/3$, $0\leq x<22/3$, and when M is potassium, $x>0$; $1\leq a\leq3$; $1\leq b\leq3$; and $0<\delta\leq32/3$. An exhaust gas system comprising the material and a method are also described herein.

19 Claims, 8 Drawing Sheets

FIG. 8

MATERIAL AND EXHAUST GAS SYSTEM AND METHOD FOR USING THE SAME

BACKGROUND

Soot, produced from the incomplete combustion of the coal, oil (such as diesel oil), wood or other carbonaceous materials, mainly consists of carbon. The exhaust gas of a diesel engine has a high level of carbonaceous soot, which is undesirable in view of environment protection. One approach for reducing/eliminating the soot emissions of a diesel engine is the employment of a diesel particulate filter in the exhaust gas system of the diesel engine. In order to decrease the temperature for periodically regenerating the diesel particulate filter and perform the regeneration continuously in situ, catalysts may be added to the diesel fuel, or may be impregnated in or coated/deposited onto the wall(s) of the diesel particulate filter to promote the oxidization of soot trapped in the diesel particulate filter at a relatively low oxidization initiation temperature.

U.S. Pat. No. 7,797,931 discloses a catalyst composition for use on a diesel particulate filter for facilitating soot oxidation comprising a catalytic metal comprising a platinum group metal selected from the group consisting of Pt, Pd, Pt—Pd, and combinations thereof and the cost of platinum group metals are high.

US patent application publication No. 2009/0203517 discloses a carbon-based combustion catalyst obtained by burning sodalite or the mixture of sodalite with an alkali metal source and/or an alkaline earth metal source.

Interstitial Cristobalite-type Compounds $(Na_2O)_{\leq 0.33}Na[AlSiO_4]((Na_2O)_{\leq 0.66}Na_2[Al_2Si_2O_8]$, or $Na_{\leq 3.32}Al_2Si_2O_{\leq 8.66})$ have been reported in an article titled as Interstitial Cristobalite-type Compounds $(Na_2O)_{\leq 0.33}Na[AlSiO_4]$ and published in JOURNAL OF SOLID STATE CHEMISTRY 61, 40-46 (1986). $Na_8Al_4Si_4O_{18}$ (or $(Na_2O)Na_2[Al_2Si_2O_8]$, or $Na_4Al_2Si_2O_9$) has been reported in Beitrage zur Beaktionsfahigkeit der silicate bei niedrigen temperaturen, II. Mitteilung., Die Strukturen $Na_2O$-reicher carnegieite., Von Werner Borchert and Jurgen Keidel, Heidelberg, Mit 6 Textabbildungen, (Eingegangen am 17, Marz 1947). US patent application publication No. 2011/0319690 discloses that a carnegieite-like material of formula $(Na_2O)_xNa_2[Al_2Si_2O_8]$, wherein 0<x≤1 may be used for converting carbon into a carbon oxide and hydrocarbon cracking in presence of steam.

It is desirable to develop a new material useful for the regeneration of a diesel particulate filter by way of oxidization of soot and a method for using the new material.

BRIEF DESCRIPTION

In one aspect, the invention relates to a material of formula I, $Na_xM_yAl_aSi_bO_\delta$, having face centered cubic (FCC) lattices forming F-4 3 m cubic structure, wherein M is at least one of lithium, potassium, rubidium, caesium, vanadium, chromium, iron, cobalt, nickel, ruthenium, rhodium, palladium, silver, osmium, iridium, platinum, gold, and cerium; 0<x+y≤22/3; wherein when y=0, 4<x≤22/3, when 0<y≤22/3, 0≤x<22/3, and when M is potassium, x>0; 1≤3; 1≤b≤3; and 0<δ≤32/3.

In another aspect, the invention relates to an exhaust gas system comprising the material of formula I.

In yet another aspect, the invention relates to a method including: contacting a carbonaceous material with an effective amount of the material of formula I to initiate the oxidization of the carbonaceous material at a first oxidization initiation temperature, wherein the first oxidization initiation temperature is lower than an oxidization initiation temperature of the carbonaceous material when a catalyst is not present.

DRAWINGS

These and other features, aspects, and advantages of the present invention will become better understood when the following detailed description is read with reference to the accompanying drawings, wherein.

DETAILED DESCRIPTION

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

As used herein, the terms "may", "could", "could be" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity may not occur. This distinction is captured by the terms "may", "could", "could be" and "may be".

The material of formula I is a crystal having a carnegieite phase, i.e., including face centered cubic (FCC) lattices forming F-4 3 m cubic structure. In some embodiments, y=0, the material may be of a crystal structure of $Na_4Al_4Si_4O_{16}$ with a carnegieite phase enriched by sodium oxide. In some embodiments, y>0, the material may be of a crystal structure of $Na_4Al_4Si_4O_{16}$ with a carnegieite phase enriched by sodium oxide and with some components thereof being substituted by M.

Figure 1A:
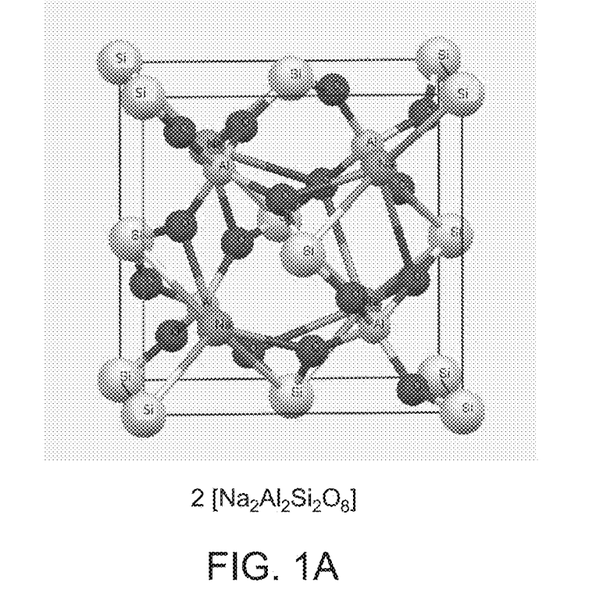
FIG. 1A illustrates a visualized crystal structure of $Na_4Al_4Si_4O_{16}$ ($2[Na_2Al_2Si_2O_8]$) having a carnegieite phase.

For illustrative purpose, FIG. 1A shows a visualized crystal structure of $Na_4Al_4Si_4O_{16}$ ($2[Na_2Al_2Si_2O_8]$) with a carnegieite phase, which is diamond cubic structure composed of 2 face centered cubic (FCC) lattices (if considering Si ions take the corner and face center position), with one lattice offsets from another along a body diagonal by ¼ of its length.

Figure 1B:
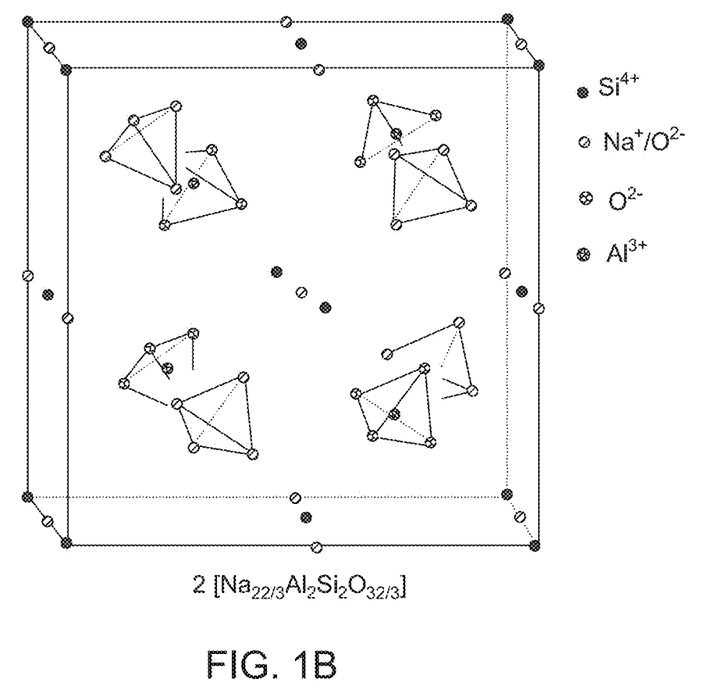
FIG. 1B shows a visualized crystal structure of $2[Na_{22/3}Al_2Si_2O_{32/3}]$ including face centered cubic (FCC) lattices forming F-4 3 m cubic structure.

FIG. 1B shows a visualized crystal structure of $2[Na_{22/3}Al_2Si_2O_{32/3}]$ having face centered cubic (FCC) lattices forming F-4 3 m cubic structure, assuming $4(Na_2O)+4/3(Na_2O)$ are incorporated into available octahedral and tetrahedral interstitial spaces of the FCC lattices of $Na_4Al_4Si_4O_{16}$.

In some embodiments, M may be at least one of potassium, lithium, cerium, cobalt, iron and vanadium.

According to examples of the invention, x and y vary depending on the specific M in the material. In some embodiments, M is potassium and $3.2 \leq x \leq 3.8$ and $0.2 \leq y \leq 0.8$. In some embodiments, M is lithium and x=3.8 and y=0.2. In some embodiments, M is cobalt and x=3.8 and y=0.2. In some embodiments, M is cerium and $3.8 \leq x \leq 3.9996$ and $0.0004 \leq y \leq 0.2$.

The values of a, b and δ vary depending on the vacancies in the lattices. In some embodiments, the material is of formula: $Na_{3.8}K_{0.2}Al_2Si_2O_9$, $Na_{3.6}K_{0.4}Al_2Si_2O_9$, $Na_{3.2}K_{0.8}Al_2Si_2O_9$, $Na_{3.8}Li_{0.2}Al_2Si_2O_9$, $Na_{3.8}Ce_{0.2}Al_2Si_2O_{9.3}$, $Na_5Al_2Si_2O_{9.5}$, $Na_{3.998}Ce_{0.002}Al_2Si_2O_{9.003}$, $Na_{3.9996}Ce_{0.0004}Al_2Si_2O_{9.0002}$, $Na_{3.72}K_{0.24}Al_2Si_{1.92}O_{8.82}$ or $Na_{3.8}Co_{0.2}Al_2Si_2O_{9.2}$.

According to examples of the invention, the values of x, y, a, b and δ may be calculated using the amounts of materials used for preparing the material of formula I. In some embodiments, the amounts of Na, M, Al, and Si in the material of formula I may be detected using such as a wave dispersive x-ray fluorescence (WD XRF) analyzer to obtain the values of x, y, a and b followed by calculating the value of δ according to the balance of charges of all elements in the material.

In some embodiments, the material of formula I is used in a diesel particulate filter of an exhaust gas system for receiving the diesel exhaust gas from a diesel engine. In some embodiments, the material is coated on the diesel particulate filter by soaking the diesel particulate filter in a slurry comprising the material and drying the diesel particulate filter after being taken out of the slurry.

In some embodiments, the material of formula I is used by contacting a carbonaceous material with an effective amount of the material to initiate the oxidization of the carbonaceous material at a first oxidization initiation temperature; wherein the first oxidization initiation temperature is lower than an oxidization initiation temperature of the carbonaceous material when a catalyst is not present.

As used herein the term "the oxidization initiation temperature" refers to a temperature at which the carbonaceous material starts to oxidize, or the lowest temperature at which the carbonaceous material is able to be oxidized. In some embodiments, the oxidization initiation temperature of the carbonaceous material may be the temperature at which the carbonaceous material starts to generate carbon monoxide and/or carbon dioxide or the temperature at which carbon monoxide and/or carbon dioxide generated from the carbonaceous material is detectable.

The contacting of the carbonaceous material and the material of formula I may be in any ways that the two materials may be contacted. In some embodiments, the carbonaceous material and the material of formula I are mixed with each other. In some embodiments, the material of formula I is impregnated in or coated/deposited onto the walls of a diesel particulate filter which are exposed to the exhaust gas stream comprising the carbonaceous material so the two materials may be contacted with each other.

The materials may be contacted in an environment comprising an oxidant, such as steam, nitrogen oxide(s), and air comprising oxygen.

As used herein the term "carbonaceous material" refers to but is not limited to carbonaceous solid or liquid or particulates or macromolecules forming the carbonaceous solid or liquid, which are derived from coal, petroleum, wood, hydrocarbons and other materials containing carbon. According to examples of the invention, the carbonaceous material may be at least one of hydrocarbon (e.g. diesel oil), carbon black and soot.

The material of formula I may lower the oxidization initiation temperature of the carbonaceous material, it may be a catalyst for the oxidization of the carbonaceous material and a catalyst where soot needs to be removed through oxidization.

According to examples of the invention, the material of formula I is stable in such environments as those comprising steam of high temperature.

EXAMPLES

The following examples are included to provide additional guidance to those of ordinary skill in the art in practicing the claimed invention. These examples do not limit the invention of the appended claims.

Kaolin was obtained from Sigma-Aldrich Corp., St Louis, Mo. (MO), USA. $NaNO_3$, $KNO_3$, $LiNO_3$, $Ce(NO_3)_3 \cdot 6H_2O$, $Co(NO_3)_2 \cdot 6H_2O$, citric acid, triethylene glycol, and isopropanol were obtained from Sinopharm Chemical Reagent Co., Ltd., Shanghai, China. Carbon black (99.99% carbon content, ACE Black, AB 50) was obtained from synthetic oil and lubricant of Texas, Inc., Houston, Tex., USA. Unless otherwise specified, all the chemicals were used without further purification.

Unless specified otherwise, the values of δ of the materials of formula $Na_xM_yAl_aSi_bO_\delta$ were calculated assuming sodium, potassium, lithium, cobalt, cerium, cerium, aluminum and silicon exist in the materials in the forms of $Na^+$, $K^+$, $Li^+$, $Co^{3+}$, $Ce^{4+}$, $Al^{3+}$ and $Si^{4+}$.

Example 1

$NaNO_3$, $KNO_3$ ($LiNO_3$, $Ce(NO_3)_3 \cdot 6H_2O$ or $Co(NO_3)_2 \cdot 6H_2O$) and citric acid were completely dissolved in water to get a solution. Tri-ethylene glycol was then added into the solution with stirring. Kaolin was finally added into the mixture and stirred for 1 hour at room temperature to form a slurry. The slurry was gradually heated up to 400° C. The heating was terminated when a powder was formed. The powder was then placed in a muffle furnace for calcination at 991° C. to form different material of formula $Na_xM_yAl_aSi_bO_\delta$.

The amounts of $NaNO_3$, $KNO_3$, $LiNO_3$, $Ce(NO_3)_3 \cdot 6H_2O$, $Co(NO_3)_2 \cdot 6H_2O$, kaolin and citric acid used for different material of formula $Na_xM_yAl_aSi_bO_\delta$ are listed in table 1 below. The concentrations of K, Li, Ce, or Co and the values of x, y, a and b are respectively calculated according to the amounts of $NaNO_3$, $KNO_3$ ($LiNO_3$, $Ce(NO_3)_3 \cdot 6H_2O$ or $Co(NO_3)_2 \cdot 6H_2O$), and kaolin used for each material of formula $Na_xM_yAl_aSi_bO_\delta$. The concentrations of K, Li, Ce, or Co, the values of x, y, and the formula of each material are listed in table 1 below.

Samples were respectively taken from materials of formula $Na_4Al_2Si_2O_9$, $Na_5Al_2Si_2O_{9.5}$, $Na_{3.8}Ce_{0.2}Al_2Si_2O_{9.3}$, $Na_{3.8}K_{0.2}Al_2Si_2O_9$, $Na_{3.8}Li_{0.2}Al_2Si_2O_9$, $Na_{3.8}Co_{0.2}Al_2Si_2O_{9.2}$ to be measured by an X-ray diffractometer (XRD) (Bruker D8 Advance, Bruker Axs GmbH Karlsruhe, Germany) for phase identification. The X-ray diffraction (XRD) patterns in 2-theta-scale of corresponding samples are shown in FIG. 2.

Figure 2:
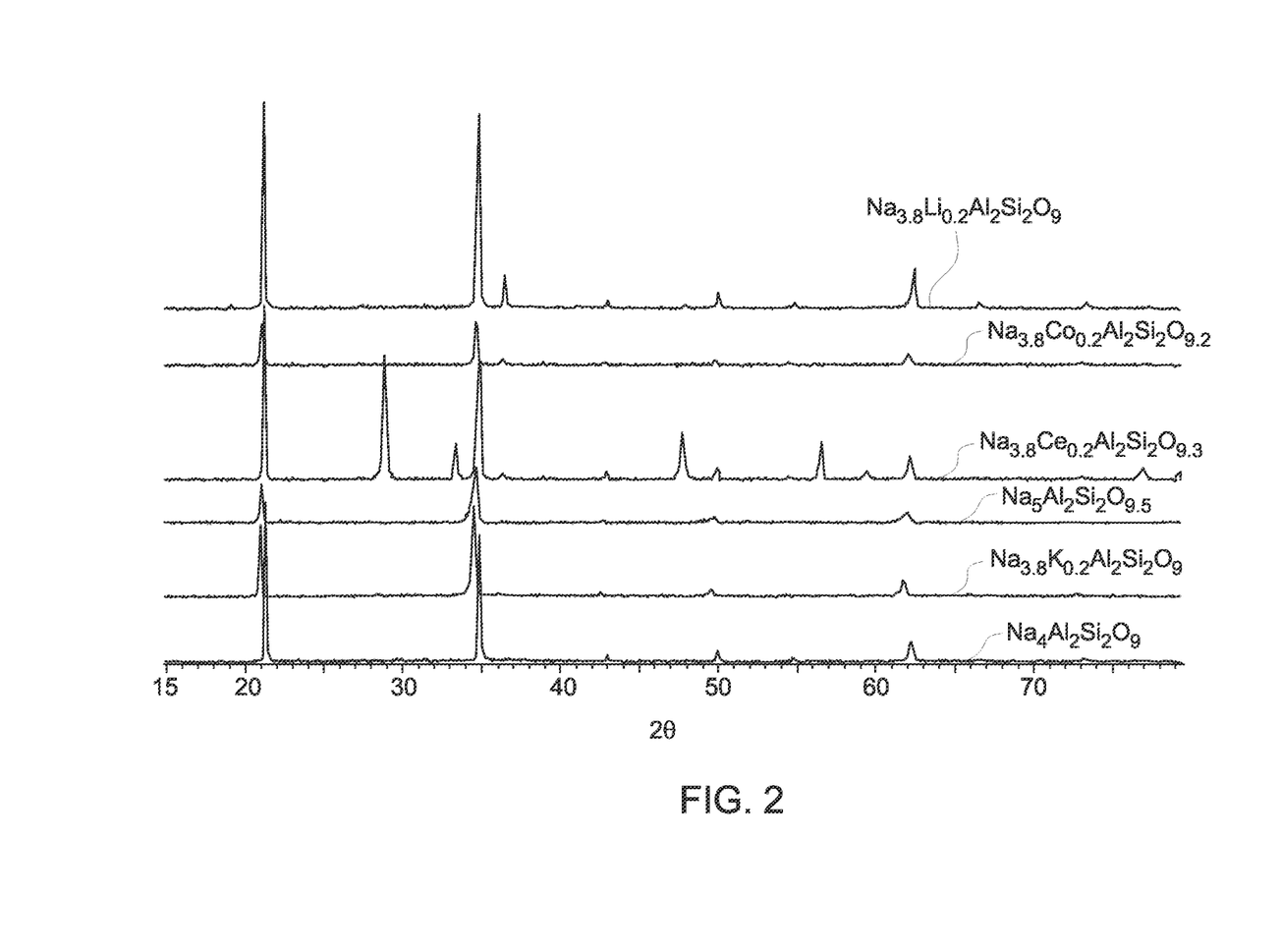
FIG. 2 shows X-ray diffraction (XRD) patterns in 2-theta-scale of corresponding samples in example 1.

It can be seen from FIG. 2 that diffraction peaks of X-ray diffraction (XRD) patterns of all samples are at around 21, 34, 43, 49 and 62, indicating that the carnegieite phases with Face Centered Cubic (fcc) lattices forming F-4 3 m cubic structures were formed in all the samples.

Unless specified otherwise, the material of formula $Na_xM_yAl_aSi_bO_\delta$ used in the following samples were prepared in method described in example 1.

Example 2

Water (65 ml) was atomized by an atomizer to produce water mist which was then carried into a heating furnace by a stream of $N_2$ of 1.2 L/min. The water mist became steam in the heating furnace at temperature of 500° C. The water steam was 23% in the steam and $N_2$ gas flow.

A sample of the material of formula $Na_{3.8}K_{0.2}Al_2Si_2O_9$ (0.8832 g, from a second batch different from the first batch from which the sample in example 1 was obtained) was put in the heating furnace with the steam and $N_2$ gas flow for treatment. After 4 hours of treatment, the feeding of water mist was stopped and the heating furnace was turned off The sample was taken out after the heating furnace was cooled down.

Figure 3:
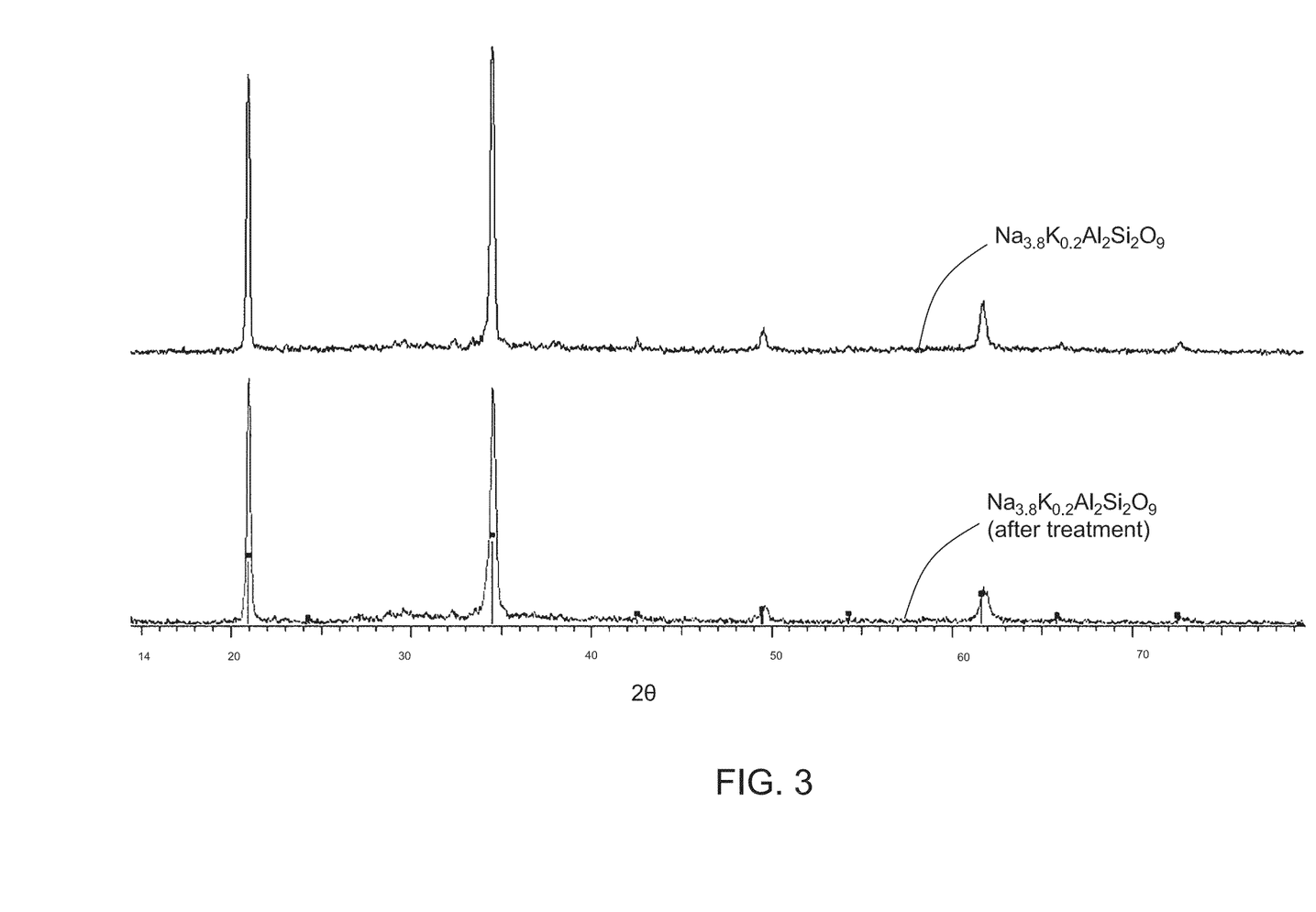
FIG. 3 shows X-ray diffraction (XRD) patterns in 2-theta-scale of corresponding sample before and after treatment in example 2.

The X-ray diffraction (XRD) patterns in 2-theta-scale of the sample of material of formula $Na_{3.8}K_{0.2}Al_2Si_2O_9$ before and after treatment are shown in FIG. 3. It can be seen from FIG. 3 that after the treatment diffraction peaks of X-ray diffraction (XRD) patterns barely changed, indicating that the carnegieite phases with Face Centered Cubic (fcc) lattices forming F-4 3 m cubic structures were maintained.

Table 2 below shows the amounts of elements of the sample of material of formula $Na_{3.8}K_{0.2}Al_2Si_2O_9$ before and after the treatment according to a wave dispersive x-ray fluorescence (WD XRF) analyzer (Rigaku ZSX 100e, Rigaku Industrial Corporation, Osaka, Japan).

The data in table 2 indicate that potassium exists inside the crystal structure of the material of formula $Na_{3.8}K_{0.2}Al_2Si_2O_9$ and not in the form of a water soluble salt. The formula of the material of formula $Na_{3.8}K_{0.2}Al_2Si_2O_9$ could also be written as

TABLE 1

| M | K | | | Li | Co |
|---|---|---|---|---|---|
| concentration of M (mol) | 5% | 10% | 20% | 5% | 5% |
| x | 3.8 | 3.6 | 3.2 | 3.8 | 3.8 |
| y | 0.20 | 0.40 | 0.80 | 0.20 | 0.20 |
| Formula | $Na_{3.8}K_{0.2}Al_2Si_2O_9$ | $Na_{3.6}K_{0.4}Al_2Si_2O_9$ | $Na_{3.2}K_{0.8}Al_2Si_2O_9$ | $Na_{3.8}Li_{0.2}Al_2Si_2O_9$ | $Na_{3.8}Co_{0.2}Al_2Si_2O_{9.2}$ |
| $NaNO_3$ (g) | 16.14 | 15.31 | 13.61 | 16.16 | 16.14 |
| $KNO_3$ (g) | 1.01 | 2.02 | 4.05 | — | — |
| $LiNO_3$ (g) | — | — | — | 0.69 | — |
| $Ce(NO_3)_3 \cdot 6H_2O$ (g) | — | — | — | — | — |
| $Co(NO_3)_2 \cdot 6H_2O$ (g) | — | — | — | — | 2.91 |
| kaolin (g) | 13.01 | 13.01 | 13.00 | 13.00 | 13.01 |
| citric acid (g) | 21.02 | 21.01 | 21.04 | 21.03 | 21.02 |
| triethylene glycol (g) | 15.00 | 15.00 | 15.03 | 14.99 | 14.82 |

| M | Ce | | | — | — |
|---|---|---|---|---|---|
| concentration of M (mol) | 500 ppm | 100 ppm | 5% | — | — |
| x | 3.998 | 3.9996 | 3.8 | 4 | 5 |
| y | 0.0020 | 0.0004 | 0.2000 | 0 | 0 |
| Formula | $Na_{3.998}Ce_{0.002}Al_2Si_2O_{9.003}$ | $Na_{3.9996}Ce_{0.0004}Al_2Si_2O_{9.0002}$ | $Na_{3.8}Ce_{0.2}Al_2Si_2O_{9.3}$ | $Na_4Al_2Si_2O_9$ | $Na_5Al_2Si_2O_{9.5}$ |
| $NaNO_3$ (g) | 16.99 | 17.01 | 16.16 | 17.05 | 21.27 |
| $KNO_3$ (g) | — | — | — | — | — |
| $LiNO_3$ (g) | — | — | — | — | — |
| $Ce(NO_3)_3 \cdot 6H_2O$ (g) | 0.0430 | 0.00879 | 4.34 | — | — |
| $Co(NO_3)_2 \cdot 6H_2O$ (g) | — | — | — | — | — |
| kaolin (g) | 13.01 | 13.00 | 13.01 | 13.00 | 13.01 |
| citric acid (g) | 21.04 | 21.03 | 21.03 | 21.03 | 21.01 |
| triethylene glycol (g) | 15.00 | 15.69 | 15.02 | 15.00 | 15.00 |

$Na_{3.72}K_{0.24}Al_2Si_{1.92}O_{8.82}$ using the WD XRF analysis data of the before treatment in table 2.

TABLE 2

| element | Before the treatment | After the treatment |
|---|---|---|
| Na (mol) | 0.92 | 0.93 |
| Si (mol) | 0.47 | 0.48 |
| Al (mol) | 0.50 | 0.50 |
| K (mol) | 0.06 | 0.06 |

Example 3

Samples of materials of formula $Na_{3.8}K_{0.2}Al_2Si_2O_9$ (respectively from first and second batches), $Na_{3.8}K_{0.2}Al_2Si_2O_9$ after treatment in example 2, $Na_{3.8}Li_{0.2}Al_2Si_2O_9$, $Na_4Al_2Si_2O_9$, $Na_5Al_2Si_2O_{9.5}$, $Na_{3.8}Co_{0.2}Al_2Si_2O_{9.2}$, $Na_{3.8}Ce_{0.2}Al_2Si_2O_{9.3}$ (20.00 mg each) and 2.00 mg carbon black were respectively mixed by mortar for 5-10 minutes and were respectively loaded in to a thermo gravimetric analysis system (TGA/SDTA 851e, from Mettler Toledo, Inc.). A sample of carbon black (2.00 mg) was loaded to the thermo gravimetric analysis system. The samples were heated up to 850° C. at 5° C./min in air at 80 ml/min, and then cooled down.

Quadstar-422 mass spectrometer (MS) from Pfeiffer Vacuum Corp. was used to analyze the concentration of carbon dioxide generated from different samples at different temperatures. The MS signals of carbon dioxide of different samples at different temperatures are shown in FIG. 4.

Figure 4:
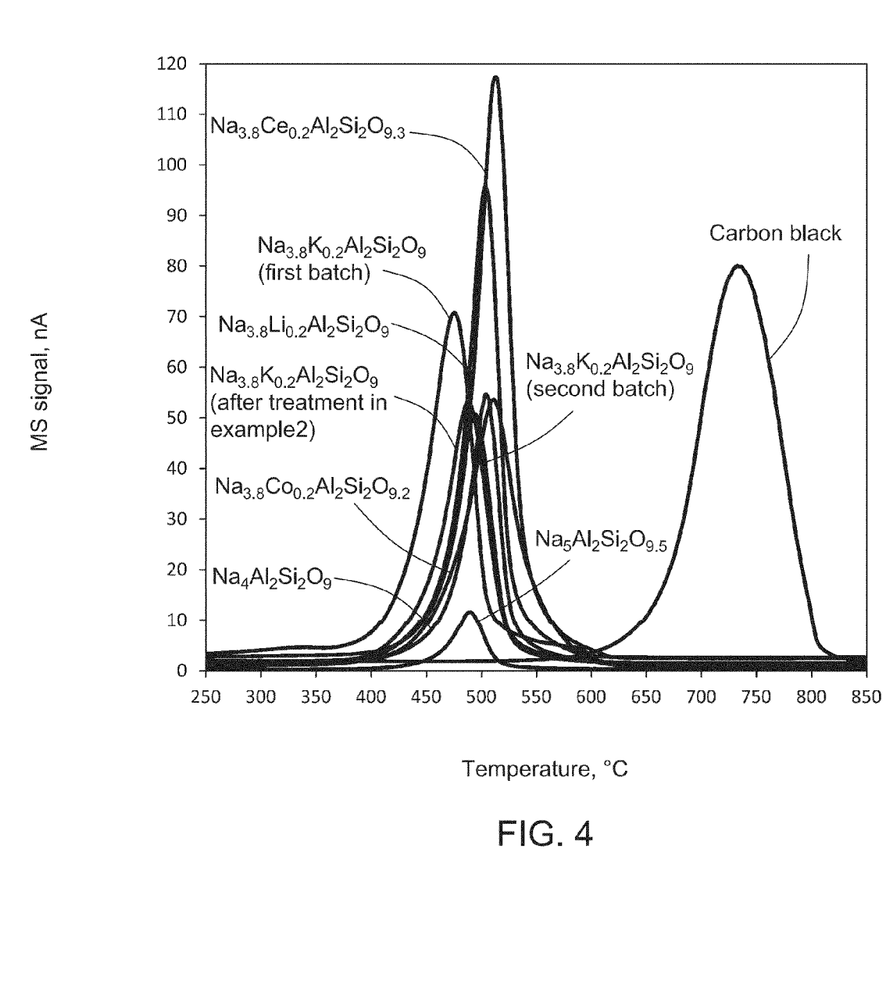
FIG. 4 shows the mass spectrometer (MS) signals of carbon dioxide generated from different samples at different temperatures in example 3.

It can be seen from FIG. 4 that the starting temperature of the mixture of $Na_{3.8}K_{0.2}Al_2Si_2O_9$ (first and second batches), $Na_{3.8}K_{0.2}Al_2Si_2O_9$ after treatment in example 2, $Na_{3.8}Li_{0.2}Al_2Si_2O_9$, $Na_{3.8}Co_{0.2}Al_2Si_2O_{9.2}$, $Na_{3.8}Ce_{0.2}Al_2Si_2O_{9.3}$ and carbon black to generate $CO_2$ (i.e., the temperature at which the MS signals in FIG. 4 started to change) was lower than that for the mixture of $Na_4Al_2Si_2O_9$ and carbon black, and carbon black alone to generate $CO_2$, indicating that the oxidization initiation temperature of carbon black is lower when mixed with the material of formula $Na_{3.8}K_{0.2}Al_2Si_2O_9$ (first and second batches), $Na_{3.8}K_{0.2}Al_2Si_2O_9$ after treatment in example 2, $Na_{3.8}Li_{0.2}Al_2Si_2O_9$, $Na_{3.8}Co_{0.2}Al_2Si_2O_{9.2}$, $Na_{3.8}Ce_{0.2}Al_2Si_2O_{9.3}$ than with the material of formula $Na_4Al_2Si_2O_9$ and alone.

In terms of the catalytic performances of the samples, the sequence was: $Na_{3.8}K_{0.2}Al_2Si_2O_9$ (first batch) > $Na_{3.8}K_{0.2}Al_2Si_2O_9$ after treatment in example 2 > $Na_{3.8}K_{0.2}Al_2Si_2O_9$ (second batch) > $Na_{3.8}Li_{0.2}Al_2Si_2O_9$ > $Na_{3.8}Ce_{0.2}Al_2Si_2O_{9.3}$ > $Na_{3.8}Co_{0.2}Al_2Si_2O_{9.2}$ > $Na_4Al_2Si_2O_9$ > $Na_5Al_2Si_2O_{9.5}$.

Example 4

Samples of carnegieite materials of formula $Na_{3.8}K_{0.2}Al_2Si_2O_9$, $Na_{3.6}K_{0.4}Al_2Si_2O_9$, and $Na_4Al_2Si_2O_9$ (20.00 mg each) and 2.00 mg carbon black were respectively mixed by mortar for 5-10 minutes and were respectively loaded into a thermogravimetric analysis system (TGA/SDTA 851e, from Mettler Toledo, Inc.). A sample of carbon black (2.00 mg) was loaded to the thermogravimetric analysis system. The samples were heated up to 850° C. at 5° C./min in air at 80 ml/min, and then cooled down.

Quadstar-422 mass spectrometer (MS) from Pfeiffer Vacuum Corp. was used to analyze the concentration of carbon dioxide generated from different samples at different temperatures. The MS signals of carbon dioxide of different samples at different temperatures are shown in FIG. 5.

Figure 5:
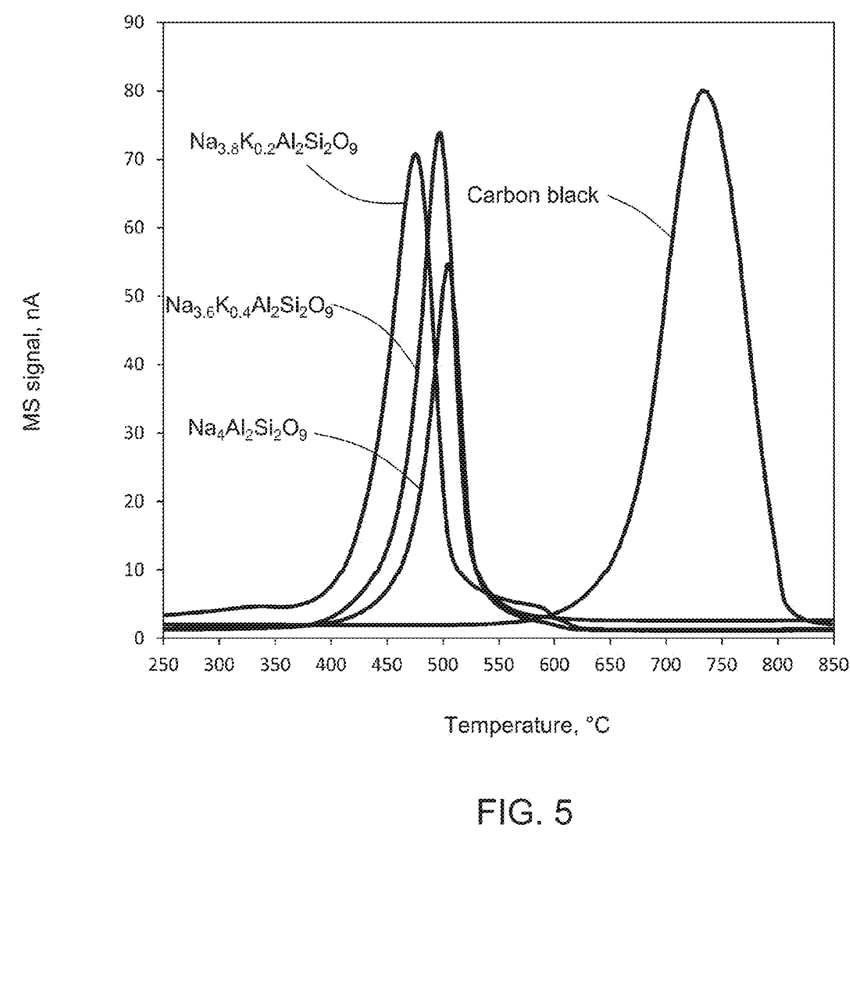
FIG. 5 shows the mass spectrometer (MS) signals of carbon dioxide generated from different samples at different temperatures in example 4.

It can be seen from FIG. 5 that the starting temperature of the mixture of $Na_{3.8}K_{0.2}Al_2Si_2O_9$ and carbon black to generate $CO_2$ was lower than that for other mixtures and carbon black alone to generate $CO_2$, and that the oxidization initiation temperature of carbon black is lower when mixed with the material of formula $Na_{3.8}K_{0.2}Al_2Si_2O_9$ than with other carnegieite materials and alone.

Example 5

Samples of carnegieite materials of formula $Na_{3.8}Ce_{0.2}Al_2Si_2O_{9.3}$, $Na_{3.998}Ce_{0.002}Al_2Si_2O_{9.003}$, $Na_{3.9996}Ce_{0.0004}Al_2Si_2O_{9.0002}$, and $Na_4Al_2Si_2O_9$ (20.00 mg each) and 2.00 mg carbon black were respectively mixed by mortar for 5-10 minutes and were respectively loaded in to a thermogravimetric analysis system (TGA/SDTA 851e, from Mettler Toledo, Inc.). A sample of carbon black (2.00 mg) was loaded to the thermogravimetric analysis system. The samples were heated up to 850° C. at 5° C./min in air at 80 ml/min, and then cooled down.

Quadstar-422 mass spectrometer (MS) from Pfeiffer Vacuum Corp. was used to analyze the concentration of carbon dioxide generated from different samples at different temperatures. The MS signals of carbon dioxide of different samples at different temperatures are shown in FIG. 6.

Figure 6:
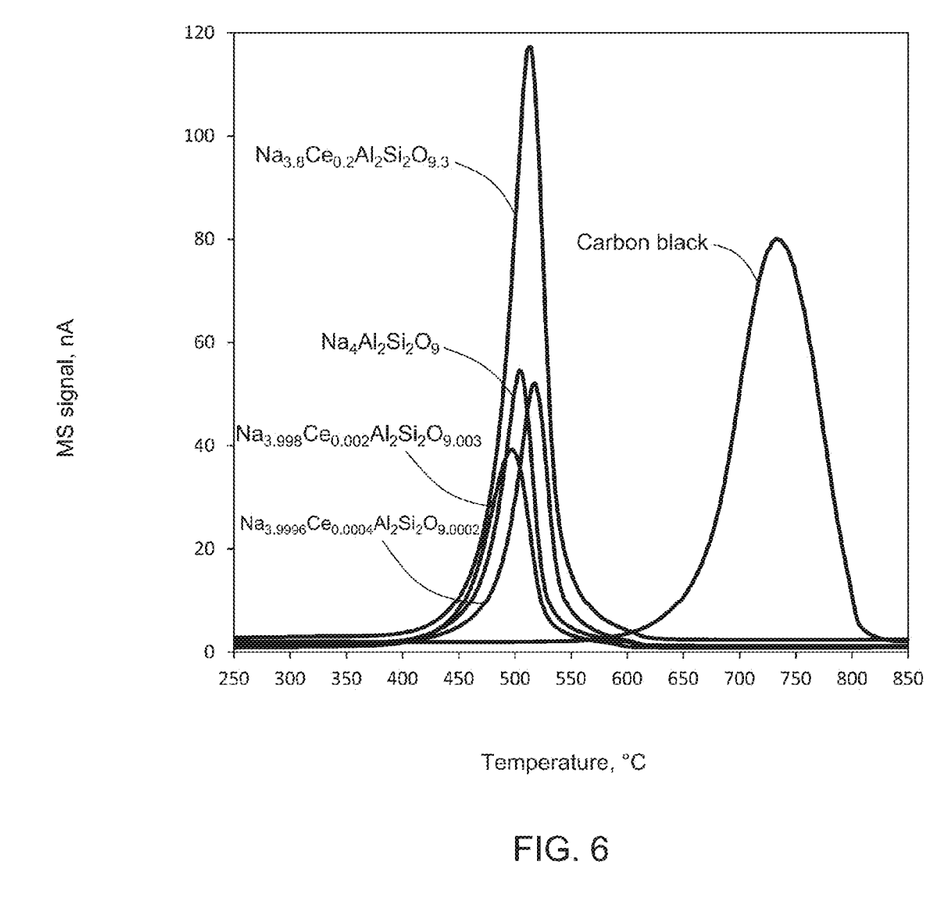
FIG. 6 shows the mass spectrometer (MS) signals of carbon dioxide generated from different samples at different temperatures in example 5.

It can be seen from FIG. 6 that the sequence of catalytic performance was: $Na_{3.8}Ce_{0.2}Al_2Si_2O_{9.3}$ > $Na_{3.998}Ce_{0.002}Al_2Si_2O_{9.003}$ > $Na_4Al_2Si_2O_9$ > $Na_{3.9996}Ce_{0.0004}Al_2Si_2O_{9.0002}$.

Example 6

Powders of the material of formula $Na_{3.8}K_{0.2}Al_2Si_2O_9$ and 0.5 wt % $Pt/Al_2O_3$ (3 g each, 425 μm-710 μm) were respectively packed in a quartz tube of 1 inch outer diameter (OD) and 0.75 inch internal diameter (ID) to form a catalyst powder bed. One end of each quartz tube was connected to a suction cup while the other end was connected to a house vacuum.

Soot from a diesel storm lamp was collected by a collection vessel and filtered by the catalyst powder bed with the house vacuum on to form a soot cake. The top layer of the soot cake on the front end of the catalyst powder bed was removed since it was not in a close contact with the catalyst. The remaining catalyst powder with 1.5 wt % of soot was subsequently used in example 7.

Example 7

Catalyst powder (2.5 g, 425-710 μm) of $Na_{3.8}K_{0.2}Al_2Si_2O_9$ and 0.5 wt % $Pt/Al_2O_3$ respectively loaded with ~1.5 wt % of soot (from Example 6) were respectively packed in a quartz tube of 1 inch outer diameter (OD) and 0.75 inch inner diameter (ID). The two tubes and a tube with only 2.5 g soot were placed in a tube furnace.

A gas stream comprising 300 ppm of NO, 9% of $O_2$, 7% of $H_2O$ and balanced with $N_2$ was allowed to pass through the tube furnace. The total gas flow rate was 3.2 standard liters per minute (SLPM). The temperature of the tube furnace was ramped from 40° C. to 640° C. at a rate of 20° C./15 min. Water was injected into the tube furnace only when the tube furnace's temperature exceeded 120° C. to avoid condensation.

The $CO_x$ (CO and $CO_2$) concentration in the gas stream in the tube furnace was measured by both the MultiGas™ 2030-HS High Speed Fourier Transform Infrared (FTIR)

Gas Analyzer from MKS Instruments and the Horiba Nondispersive Infrared (NDIR) $CO/CO_2$ analyzer. The $CO_x$ concentrations measured by both methods were in good agreement with each other.

Figure 7:
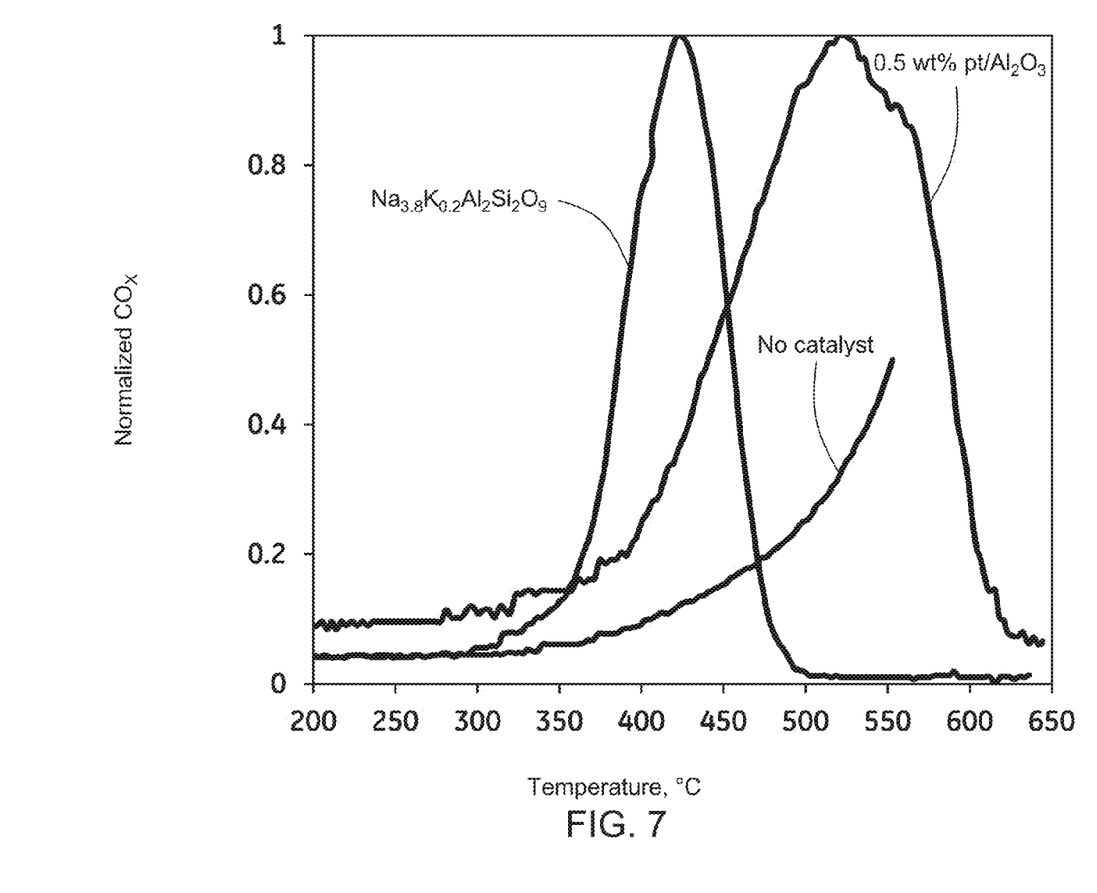
FIG. 7 is a graph showing the normalized $CO_x$ generated from different samples at different temperatures in example 7.

Dividing the sum of the CO and $CO_2$ concentrations at each temperature point by the maximum sum at all temperatures to obtain the normalized $CO_x$ concentration at each temperature point, which are shown in FIG. 7 and indicate that the oxidization initiation temperature of soot is lower when mixed with the material of formula $Na_{3.8}K_{0.2}Al_2Si_2O_9$ than with 0.5 wt % $Pt/Al_2O_3$ catalyst and alone.

Example 8

Powders of $Na_{3.8}K_{0.2}Al_2Si_2O_9$ and $Na_4Al_2Si_2O_9$ (15 g each) were respectively pre-mixed with 50 g iso-propanol (IPA) to form a slurry, followed by mixing them with 150 g Yttrium stabilized zirconium (YSZ) milling balls (5 mm). After each mixture was ball milled for one hour.

A monolith (length: 2.54 cm, diameter: 1.85 cm) was soaked into one slurry for 30 seconds, which was dried in a flowing stream of air for 20 seconds, followed by blasting hot air from a heat gun for about 1 minute. The process was repeated 4 times or more until visible inspection confirmed blockage of some channels in the monolith. The weight gain was used to gauge the quantity of the catalyst deposited on the porous monolith. Finally, the coated monolith was calcined at 550° C. for 4 hours in air.

Example 9

Each coated monolith (obtained in example 8) was loaded in a quartz tube of 1 inch OD and 0.75 inch ID. The two tubes were placed in a tube furnace. An empty tube was also placed in the tube furnace.

A gas stream consisting 300 ppm of NO, 9% of $O_2$, 7% of $H_2O$, ultra low sulfur diesel (ULSD) vapor (C1:N=6) and balanced with $N_2$ (in volume) was allowed to pass through the tube furnace. The gas hour space velocity (GHSV) was kept at 30,000 hr$^{-1}$. The temperature of the tube furnace was ramped from 200° C. to 560° C. at a rate of 20° C./15 min.

The $CO_x$ ($CO+CO_2$) concentration in the gas stream was measured by the MultiGas™ 2030-HS High Speed Fourier Transform Infrared (FTIR) Gas Analyzer. The total ULSD concentration in terms of C1 was measured by Horiba NDIR $CO/CO_2$ analyzers after all ULSD was converted to $CO_x$ by the diesel oxidation catalyst (DOC) unit placed at the downstream of the FTIR gas analyzer. The $CO_x$ yield was calculated by dividing the $CO_x$ concentration obtained from the FTIR measurement by the $CO_x$ concentration measured from the NDIR measurement.

Figure 8:
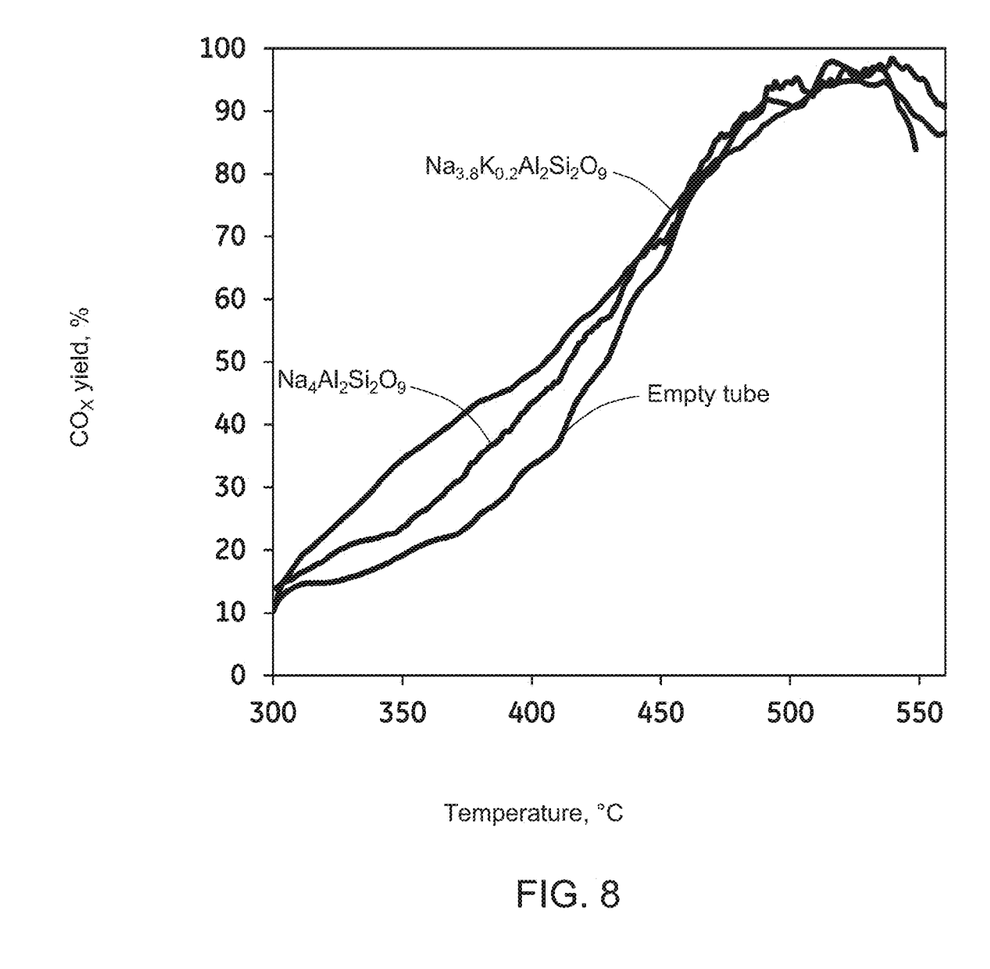
FIG. 8 shows the $CO_x$ yield of different samples at different temperatures in example 9.

FIG. 8 shows $CO_x$ yield of the empty tube and the tubes with the monoliths. It can be seen that ULSD gave 30% of $CO_x$ yield at around 400° C. without catalyst but the carnegieite catalysts ($Na_{3.8}K_{0.2}Al_2Si_2O_9$ and $Na_4Al_2Si_2O_9$) showed some catalytic performance in the presence of diesel.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A material of formula I, having face centered cubic (FCC) lattices forming F-43 m cubic structure, $Na_xM_yAl_aSi_bO_\delta$          I, wherein M is at least one of lithium, potassium, rubidium, caesium, vanadium, chromium, iron, cobalt, nickel, ruthenium, rhodium, palladium, silver, osmium, iridium, platinum, gold, and cerium;

$0<x+y\leq22/3$; wherein $0<y\leq22/3$, $0\leq x<22/3$, and when M is potassium, $3.2<x\leq3.8$ and $0.2\leq y\leq0.8$;

$1\leq a\leq3$; $1\leq b\leq3$; and $0<\delta\leq32/3$.

2. The material of claim 1, wherein M is at least one of potassium, lithium, cerium, and cobalt.

3. The material of claim 1, wherein M is potassium and $3.2\leq x\leq3.8$ and $0.2\leq y\leq0.8$.

4. The material of claim 1, wherein M is lithium and x=3.8 and y=0.2.

5. The material of claim 1, wherein M is cobalt and x=3.8 and y=0.2.

6. The material of claim 1, wherein M is cerium and $3.8\leq x\leq3.9996$ and $0.0004\leq y\leq0.2$.

7. The material of claim 1, being of formula: $Na_{3.8}K_{0.2}Al_2Si_2O_9$, $Na_{3.6}K_{0.4}Al_2Si_2O_9$, $Na_{3.2}K_{0.8}Al_2Si_2O_9$, $Na_{3.8}Li_{0.2}Al_2Si_2O_9$, $Na_{3.8}Ce_{0.2}Al_2Si_2O_{9.3}$, $Na_{3.998}Ce_{0.002}Al_2Si_2O_{9.003}$, $Na_{3.9996}Ce_{0.0004}Al_2Si_2O_{9.0002}$, $Na_5Al_2Si_2O_{9.5}$, $Na_{3.72}K_{0.24}Al_2Si_{1.92}O_{8.82}$, or $Na_{3.8}Co_{0.2}Al_2Si_2O_{9.2}$.

8. An exhaust gas system comprising the material of claim 1.

9. The exhaust gas system of claim 8, comprising a diesel particulate filter receiving diesel exhaust gas from a diesel engine and coated with the material of claim 1.

10. The exhaust gas system of claim 8, wherein M is at least one of potassium, lithium, cerium, cobalt, iron, and vanadium.

11. The exhaust gas system of claim 8, wherein $3.2\leq x\leq3.9996$ and $0.0004\leq y\leq0.8$.

12. The exhaust gas system of claim 8, wherein M is potassium and $3.2\leq x\leq3.8$ and $0.2\leq y\leq0.8$.

13. The exhaust gas system of claim 8, wherein the material is of formula: $Na_{3.8}K_{0.2}Al_2Si_2O_9$, $Na_{3.6}K_{0.4}Al_2Si_2O_9$, $Na_{3.2}K_{0.8}Al_2Si_2O_9$, $Na_{3.8}Li_{0.2}Al_2Si_2O_9$, $Na_{3.8}Ce_{0.2}Al_2Si_2O_{9.3}$, $Na_{3.998}Ce_{0.002}Al_2Si_2O_{9.003}$, $Na_5Al_2Si_2O_{9.5}$, $Na_{3.9996}Ce_{0.00004}Al_2Si_2O_{9.0002}$, $Na_{3.72}K_{0.24}Al_2Si_2O_{8.82}$, or $Na_{3.8}Co_{0.2}Al_2Si_2O_{9.2}$.

14. A method comprising:
contacting a carbonaceous material with an effective amount of the material of claim 1 to initiate the oxidization of the carbonaceous material at a first oxidization initiation temperature;
wherein the first oxidization initiation temperature is lower than an oxidization initiation temperature of the carbonaceous material when a catalyst is not present.

15. The method of claim 14, wherein the contacting is in an environment comprising an oxidant.

16. The method of claim 14, wherein the contacting is in an environment comprising at least one of oxygen, air, steam and nitrogen oxide.

17. The method of claim 14, wherein M is at least one of potassium, lithium, cerium, and cobalt.

18. The method of claim 14, wherein the material is of formula: $Na_{3.8}K_{0.2}Al_2Si_2O_9$, $Na_{3.6}K_{0.4}Al_2Si_2O_9$, $Na_{3.2}K_{0.8}Al_2Si_2O_9$, $Na_{3.8}Li_{0.2}Al_2Si_2O_9$, $Na_{3.8}Ce_{0.2}Al_2Si_2O_{9.3}$, $Na_{3.998}Ce_{0.002}Al_2Si_2O_{9.003}$, $Na_5Al_2Si_2O_{9.5}$, $Na_{3.9996}Ce_{0.0004}Al_2Si_2O_{9.0002}$, $Na_{3.72}K_{0.24}Al_2Si_{1.92}O_{8.82}$ or $Na_{3.8}Co_{0.2}Al_2Si_2O_{9.2}$.

19. The method of claim 14, wherein the carbonaceous material comprises at least one of hydrocarbon, carbon black and soot.

* * * * *